Nov. 11, 1969     L. C. TRENT     3,477,389
RAPID TRANSIT SYSTEM
Filed June 27, 1966     2 Sheets-Sheet 1
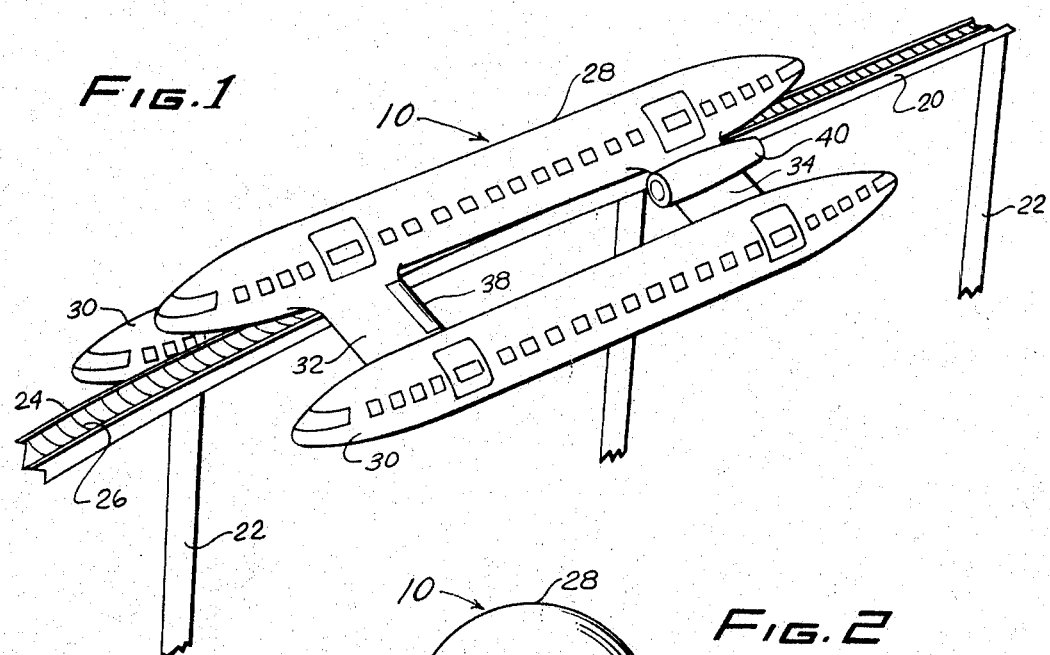
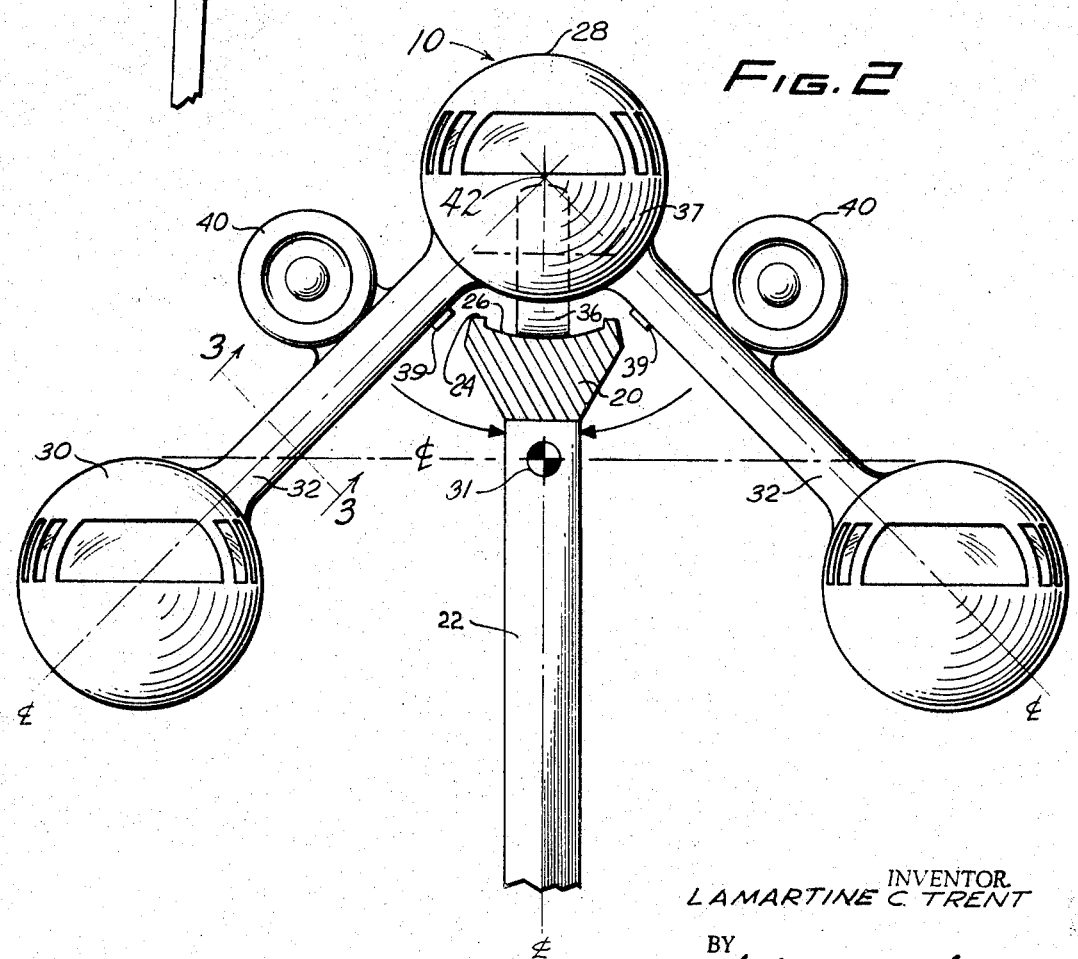
INVENTOR.
LAMARTINE C. TRENT
BY
ATTORNEY Nov. 11, 1969     L. C. TRENT     3,477,389
RAPID TRANSIT SYSTEM
Filed June 27, 1966     2 Sheets-Sheet 2
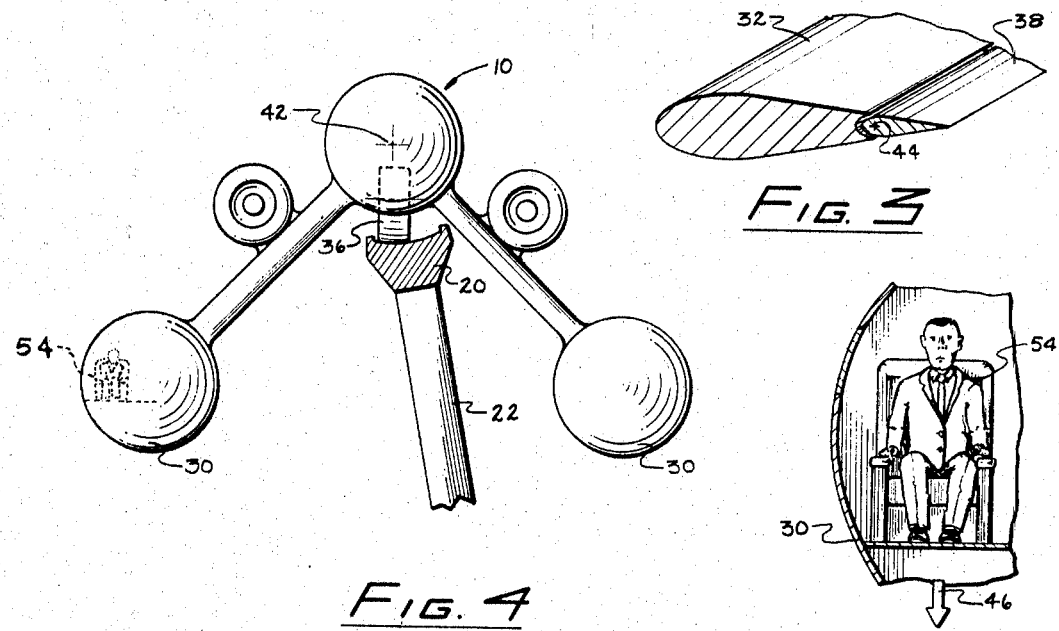
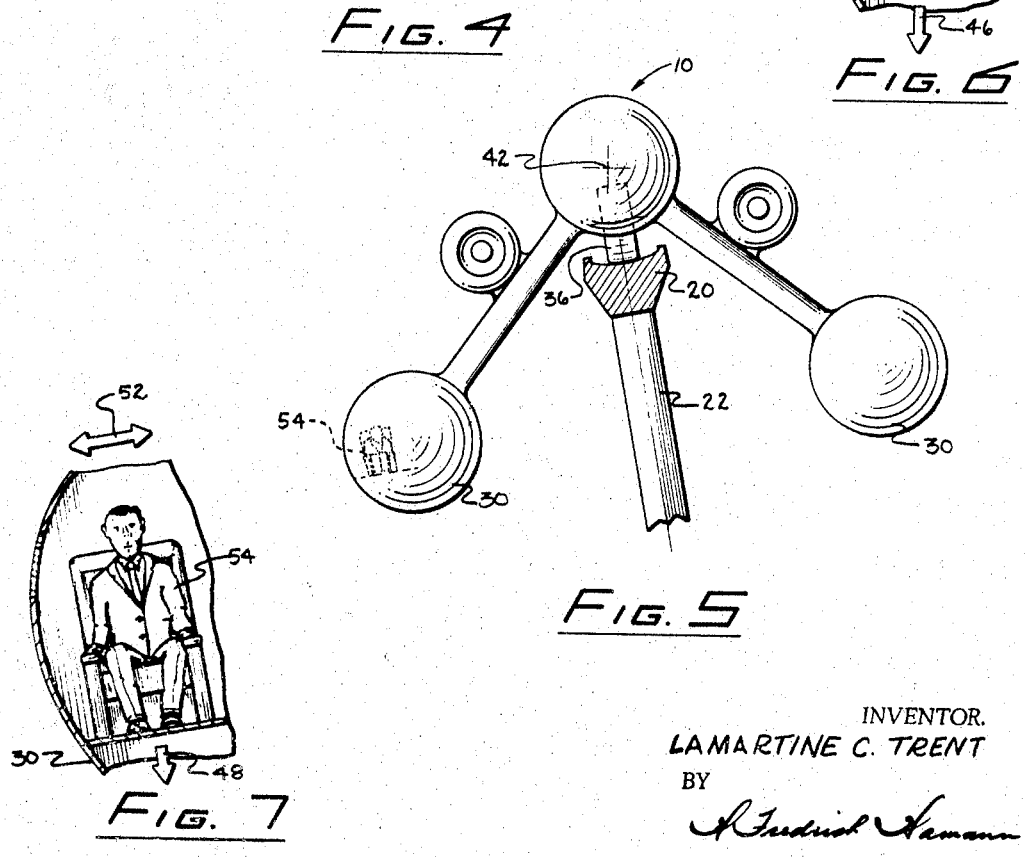
INVENTOR.
LAMARTINE C. TRENT
BY
ATTORNEY

United States Patent Office 3,477,389
Patented Nov. 11, 1969

3,477,389
RAPID TRANSIT SYSTEM
Lamartine C. Trent, Portuguese Bend, Calif., assignor to North American Rockwell Corporation, a corporation of Delaware
Filed June 27, 1966, Ser. No. 560,558
Int. Cl. B61b 13/06; E01b 25/08; B61d 15/00
U.S. Cl. 104—118                                    17 Claims

ABSTRACT OF THE DISCLOSURE

A monorail system has a single track supported on piers which are banked on curves. A high speed vehicle has a center of gravity below the track and is supported thereon by wheels which are laterally movable across the track so that free rolling movement of the vehicle about the track is permitted over a limited range within which no side loads are applied to the track. The stated rolling movement occurs about a roll axis substantially coinciding with the center of curvature of the concave track surface when seen in transverse cross-section. Gravity and acceleration forces are applied to the track and supporting piers substantially as pure compression loads during vehicle operation and no lateral forces are applied to the passengers in the vehicle.

---

The present invention relates to rail transportation and more particularly to a high speed rapid transit system supported on a monorail structure.

Conventional rapid transit systems are generally of low speed because of the heavy structure used in both vehicle construction and propulsion system equipment. Further significant limitations on operational speeds exist because of the low rotational mass inertia about the rail when the center of gravity is positioned above the rail. Such prior art arrangements generally require either that the vehicle be supported substantially above the running surfaces and thereby introduce significant side load coupling into the supporting rail structure or that a suspension support arrangement be used thereby materially increasing the cost of the rail structure.

It is the principal object of the present invention to utilize aircraft structure technology in developing a rapid transit system which provides a high speed, competitive, low cost transportation system.

Therefore, it is an object of the present invention to provide a rapid transit vehicle configuration having increased directional and rotational balance stability.

A further object of the present invention is to provide a rapid transit vehicle arrangement having a center of gravity below the rail and a large rotational mass inertia about the rail.

Another object of the present invention is to provide a rapid transit system having a monorail support arrangement and vehicle configuration such that the load is passed into the rail structure with no major side loading of the support arrangement.

A still further object of the present invention is to provide a vehicle configuration having a plurality of outboard cargo or passenger carrying fuselage members which are parallel and aligned with the monorail supporting structure and which are supported by a rail following unit from which the outboard members are structurally depending.

These and other objects of the present invention will be more apparent from the following description and drawings, wherein:

FIG. 1 is a perspective view showing the general arrangement of the present invention.

FIG. 2 is an end view of the vehicle, track and supporting arrangement of the present invention.

FIG. 3 is an isolated view of a structural detail in the vehicle shown by FIGS. 1 and 2, taken along line 3—3 in FIG. 2.

FIGS. 4 and 5 are simplified outline drawings of the vehicle and track shown in FIGS. 1 and 2 but in various operative load conditions.

FIGS. 6 and 7 are isolated views of a passenger in the vehicles shown in FIGS. 4 and 5, respectively.

With these objects in mind, the present invention has as its primary feature a structural arrangement of the vehicle and supporting track such that the center of gravity is located below the track surface with the side extended fuselages providing a large mass inertia for roll stability. In this manner increased rotational balance and stability is achieved while utilizing a low cost track structure. Another feature of the present invention is the provision of a free but controlled axis of roll movement for banking and turning. Such an arrangement minimizes the side loading thrusted into the track structure and allows the use of less costly track supporting structures, since substantially pure compressive force is applied to the track and piers in all modes or conditions of operation.

Referring now to the drawings in detail, FIG. 1 shows a monorail 20 supported in elevated relationship to the ground on elongate piers 22 periodically spaced along the length of the monorail 20. The piers 22 are positioned to receive the vehicle axial support loading during all operational modes with the piers 22 banked on curves as suggested in FIGURE 5 to minimize side loading. The upper portion 24 of the rail 20 has a running surface 26 on which the vehicle wheels 36 make rolling contact. Surface 26 has a concave contour substantially defined by an arc about center 42 when viewed in transverse cross section as seen in FIGURE 2.

The preferred embodiment of the vehicle configuration is also shown by vehicle 10 in FIG. 1 and comprises an elongate main fuselage member 28 on which a pair of in-line wheel structures are mounted at opposite ends to movably support the fuselage 28 on the rail 20. Connected to the main fuselage member 28 are at least two parallel side fuselage members 30. The outboard fuselages are interconnected to the center fuselage by rigid forward 32 and aft 34 structural wings which may have airfoil cross-sectional shape as seen in FIGURE 3. These wings 32 and 34 which preferably angle downwardly and outwardly from the main or center fuselage member 28 support the total cantilevered weight of the outboard fuselages 30 whereby vehicle 10 is a single unitary structure with a roll axis substantially corresponding with center 42 when the vehicle is at rest in the view shown by FIGURE 2 and during substantially all modes of operation. The foregoing relationship results in a normally balanced force couple about the area of contact between wheels 36 and surface 26 in respect of external loads applied to vehicle 10 and which would tend to rotate center of gravity 31 away from alignment with axis 42 in the view shown by FIGURE 2. In the preferred embodiment, the fuselages 30 are of the same size and aerodynamic configuration as the center member 28 although different sizes and configurations may be used where desired, and the fuselages 30 are in fixed relationship with center fuselage 28. In the embodiment shown an illustrative structure would have three passenger containing fuselages, each 100 ft. long and 10 ft. in diameter, so that the vehicle would be about 40 ft. wide, 25 ft. high and 100 ft. long. Such a vehicle would carry 300 passengers, cruise at 300 m.p.h. and have a gross weight of about 150,000 lb. if aluminum aircraft structure is used.

FIG. 2 shows the cantilevered support and monorail arrangement of the present invention in more detail. The main fuselage 28 is substantially cylindrical and supported on in-line wheel assemblies 36 rotatable about an axis 37 preferably located within the main fuselage 28 and substantially midway between center 42 and surface 26. The running surface 26 has a concave cross-sectional surface that mates with the contact surfaces of the wheels 36 of the vehicle 28. The curved mating track 26 and wheel 36 surfaces will retain the vehicle directional alignment while providing the vehicle with a controlled free roll axis for thrusting change of direction centrifugal loads axially into the rails whereby such loads will be applied to piers 22 in substantially pure compression even during banked turns as suggested in FIGURE 5.

It will be understood by those skilled in the art that in the absence of externally applied loads, wheels 36 naturally remain in the transverse center of surface 26 as shown in FIGURE 2 whether vehicle 10 is moving fast or slowly on a banked curve or standing still on straight track. Since fuselages 30 on either side of center fuselage 28 are substantially of equal weight, vehicle 10 is balanced about axis 42, and any lateral loads applied to either side of vehicle 10 which would tend to rotate the vehicle about roll axis 42 would be resisted by the downward pull of gravity on whichever of fuselages 30 were higher than the other. Moreover, when vehicle 10 is for any reason completely stopped, fuselages 30 will naturally become level with each other even if track 20 is curved and banked as suggested in FIGURE 4. Absolutely no side loads are applied on track 20 or pier 22 in the condition shown by FIGURE 4 and the only force on passengers occupying fuselages 28 or 30 such as passenger 54 will be gravity force as suggested by arrow 46 in FIGURE 6, so that passengers will not be tipped out of their seats. Moreover, as seen from FIGURE 5, acceleration or centrifugal forces occurring by rapid movement of vehicle 10 relative to track 20 on a banked turn results in substantially pure compressive force on the track and supporting piers without any side loads, and no lateral forces are applied to the passengers but only axial acceleration force generally through the center axis of each passenger and seat as suggested by arrow 48 in FIGURE 7. In the operational mode suggested by FIGURES 5 and 7, no lateral loads are applied to the passenger in the directions suggested by arrow 52 of FIGURE 7 and the passengers are not thrown from side to side in their seats regardless of the speed of travel of vehicle 10. Also, since the width of running surface 26 is greater than the width of wheels 36 as seen in FIGURE 2, it will be understood that controlled movement of the wheels laterally across the surface during forward movement of vehicle 10 on monorail 20 may be accomplished by ailerons 38. It is this freedom of lateral movement of wheels 36 which provides many advantages in the system disclosed, including economy of the track and its supports both regarding initial construction costs and maintenance costs. Thus, concrete is less expensive than steel but possesses useful strength primarily under compressive loads only. Also, absolute precision in the width or directional continuity of monorail 20 is not necessarily in view of the relatively wide although limited range of lateral movement permitted between the wheels and surface 26, whereby environmental temperature system effects and the like may be totally ignored. In this respect, the system disclosed herein sharply differs sharply from some monorails in the prior art which require careful daily checking over their entire length to insure constant dimensional and directional accuracy because the safety of passengers depends upon an extremely sensitive dimensional relationship between the monorail track and the vehicle supported thereon, especially by reason of side loads applied between the vehicle and the track.

Directional and rotational balance stability of the vehicle on the monorail 20 is achieved by the low outwardly extending positions of the outboard or secondary fuselages 30. This arrangement creates a center of gravity 31 of the total vehicle configuration which is below the rail 20 and provides a large rotational mass inertia about the rail. The angular relationship between supporting wings 32 interconnecting the subtending secondary fuselages is shown as being 90°. However, it is within the purview of the present invention to utilize any angle which provides a center of mass of the vehicle which is below the mating surface between the track 26 and wheel 36.

While the preferred embodiment shows a center fuselage member 28 and secondary fuselage members 30 equipped for passenger transportation, it is within the purview of the present invention to utilize the central member 28 for propulsion only. In such an arrangement the secondary members 30 would be used for passenger transportation while the central member 28 would contain controls, fuel and propulsion units. The low center of gravity configuration of the present invention achieves rotational equilibrium without thrusting large rotational side loads into the rail substructure. Support and operational loads from the vehicle will pass axially into the rail structure at all times. Vehicle roll frequency and acceleration rate may be controlled by ailerons 38 located in the trailing edge of the forward structural wing 32 and adapted to pivot about an axis 44 as seen in FIGURE 3. The loading on structural wings 32 and 34 provides the vehicle with positive rail contact and roll control during all operational modes, although some lift may be provided either by these surfaces or by the aerodynamic design of fuselages 28 and 30 to reduce wheel load at very high speeds, i.e., over 300 m.p.h.

In order to alleviate adverse affects which might be caused by cross winds or similar effects tending to move the center of gravity to a lateral position, limiting runners or wheels 39 may be used on the inner surfaces of wing structures 32 and 34. Such mechanisms would contact the side of the rail structure 20 should roll movement be too great. Other means well known in the art may also be used for limiting maximum roll.

The preferred embodiment utilizes axial flow jet propulsion 40, although other more conventional propulsion systems may be used including electrical or propeller propulsion. While the propulsion units 40 are shown as mounted on aft wing support members 34 they may be mounted on the center fuselage element 28 or the secondary fuselage 30.

While a preferred embodiment of the invention has been described in detail, it will be apparent to those skilled in the art that various modifications and changes may be made without departing from the spirit of the invention. Therefore, the present invention is not limited by the foregoing description but only by the appended claims.

I claim:

1. A unitary vehicle adapted for movement along an elevated track comprising a center fuselage member, said center member having rotatable means in contact with said track for supporting said member for forward movement along said track and rolling movement about a longitudinal axis through said center member, at least a pair of secondary fuselage members, means for supporting at least one of said secondary fuselage members on each side of said center fuselage member in a fixed relationship therewith and in a position below said center member with the center of gravity of said vehicle below said first named means and below said longitudinal roll axis of said vehicle.

2. The vehicle of claim 1, including propulsion means supported on said means for supporting said secondary members.

3. The vehicle of claim 1, wherein said rotatable means for supporting said center member is located in the bottom of said member and comprises a plurality of in-line wheel members containing a stationary surface on said track and laterally movable with respect thereto during forward movement therealong.

4. The vehicle of claim 3, wherein said center fuselage and said secondary fuselages are side by side and/or parallel.

5. The vehicle of claim 1, said means for supporting said secondary fuselages includes airfoil members for providing directional and rotational balance stability of said vehicle.

6. The vehicle of claim 5, wherein said airfoil members include aerodynamic surfaces pivotally mounted thereon.

7. The vehicle of claim 1, wherein said means for supporting said secondary fuselage members includes a pair of rigid airfoil elements interconnecting each of said secondary fuselage members with said center member symmetrically about a plane containing said center of gravity.

8. The vehicle of claim 7, wherein at least one of said airfoil elements includes an aerodynamic control surface.

9. The vehicle of claim 7, wherein each of said airfoil elements interconnecting the aft ends of said center and secondary members supports means for propelling said vehicle.

10. A monorail transportation system comprising a monorail vehicle, a track having a running surface on its top and supported by piers connected to the bottom, means for supporting said vehicle on said track and laterally movable with respect thereto, said vehicle having means for maintaining its center of gravity lower than said running surface, said last named means including a plurality of depending members, said running surface having a concave curved cross-sectional contour, said means for supporting said vehicle on said track comprising wheels adapted to make rolling contact with said surface.

11. A monorail system according to claim 10, wherein said track is supported on a plurality of elongate piers each having a longitudinal axis and said pier axes are angularly displaced from a vertical reference datum where said track is curved, said displacement being sufficient for centrifugal loads resulting from change of directional movement of said vehicle to apply substantially pure compressive loads on said piers.

12. The structure set forth in claim 10 above, wherein: said concave curved cross-sectional contour is defined by a center of curvature spaced above said running surface a distance substantially equal to the diameter of said wheels.

13. A unitary vehicle adapted for movement along an elevated monorail, comprising:
a pair of substantially parallel elongate fuselage members, rigid structural means connecting said pier of fuselage members together to form a unitary monorail vehicle rotatably movable about a single roll axis,
mounting means for mounting said vehicle on said monorail movably relative thereto, and
said mounting means being situated above the center of gravity of said vehicle and below said axis.

14. The structure set forth in claim 13 above, wherein: said mounting means comprises at least two wheels horizontally aligned with each other and vertically aligned with said center of gravity of said vehicle.

15. The structure set forth in claim 14 above, wherein: said monorail includes a concave surface in transverse cross-section, the center of curvature of said concave surface substantially coinciding with said roll axis.

16. The structure set forth in claim 14 above, wherein: said wheels rotate about rotation axes situated substantially midway between said center of curvature and the transverse center of said concave surface in cross-section.

17. In a monorail system the combination of:
a monorail having a continuous running surface,
a vehicle adapted to move along said monorail,
wheel means on said vehicle including at least one wheel in rolling contact with an area portion of said surface for supporting said vehicle entirely on said monorail,
said running surface being at least twice the width of said wheel,
control means for moving said arm of contact laterally across said width of said running surface,
said control means comprising movable aerodynamic surfaces, and
substantially all force transmitted between said wheel and said surface being compressive force.

References Cited

UNITED STATES PATENTS

| 2,976,820 | 3/1961 | Schaar | 104—23 |
| 2,717,744 | 9/1955 | Birnbaum | 104—23 |
| 550,878 | 12/1895 | Gilman | 104—119 |
| 684,327 | 10/1901 | Watson | 104—120 |
| 1,415,400 | 5/1922 | Roghmanns | 104—120 |

FOREIGN PATENTS

| 272,984 | 4/1951 | Switzerland. |
| 376,478 | | Italy. |

ARTHUR L. LAPOINT, Primary Examiner

RICHARD A. BERTSCH, Assistant Examiner

U.S. Cl. X.R.

104—23